United States Patent [19]

Lee

[11] Patent Number: 4,488,017

[45] Date of Patent: Dec. 11, 1984

[54] CONTROL UNIT FOR VIDEO GAMES AND THE LIKE

[75] Inventor: Hugh M. Lee, San Jose, Calif.

[73] Assignee: Amiga Corporation, Santa Clara, Calif.

[21] Appl. No.: 464,311

[22] Filed: Feb. 7, 1983

[51] Int. Cl.³ .................... H01H 25/00; H01H 13/70
[52] U.S. Cl. .................................. 200/5 R; 200/6 A; 200/17 R; 200/86.5; 200/153 K; 273/148 B
[58] Field of Search ........ 273/DIG. 28, 85 G, 148 R, 273/148 B; 200/5 R, 6 R, 6 A, 86.5, 86 R, 153 K, 264, 157; 177/177

[56] References Cited

U.S. PATENT DOCUMENTS

| | | | |
|---|---|---|---|
| 2,812,422 | 11/1957 | Provi | 177/177 |
| 3,300,594 | 1/1967 | Paine et al. | |
| 3,699,294 | 10/1972 | Sudduth | |
| 3,970,984 | 7/1976 | Grubenmann | 200/86.5 X |
| 3,988,556 | 10/1976 | Hyodo | 200/264 |
| 4,029,915 | 6/1977 | Ojima | 200/5 A |
| 4,229,633 | 10/1980 | Gillian | |
| 4,246,452 | 1/1981 | Chandler | 200/5 A |
| 4,256,931 | 3/1981 | Palisek | |
| 4,297,542 | 10/1981 | Shumway | 200/6 A |
| 4,349,708 | 9/1982 | Asher | 200/6 A |
| 4,360,716 | 11/1982 | Fiorella | 200/86 R X |
| 4,439,648 | 3/1984 | Reiner et al. | 200/6 A |
| 4,458,114 | 7/1984 | May | 200/6 A |
| 4,461,935 | 7/1984 | Guenther | 200/5 R |

FOREIGN PATENT DOCUMENTS 2703401  7/1977  Fed. Rep. of Germany ...... 200/157

OTHER PUBLICATIONS

"Video Aid to Rehabilitation of Standing Balance" Medical and Biological Engineering and Computing, pp. 281-285, May, 1982.

*Primary Examiner*—Richard C. Pinkham
*Assistant Examiner*—Scott L. Brown
*Attorney, Agent, or Firm*—Fitch, Even, Tabin & Flannery

[57] ABSTRACT

Two embodiments of a multi-directional control unit for video games and the like are disclosed. In each embodiment, the control unit includes a base structure, a circuit board with directional circuit segments, a resilient conductive pad arranged adjacent the circuit segments on the circuit board, a raised matrix on the conductive pad normally maintaining the pad in spaced apart relation from the circuit segments, a control element movable relative to the base structure and a directional actuator coupled with the control element for response to relative movement between the control element and the base structure for applying pressure to the resilient pad and establishing electrical contact with one or more of the circuit segments on the circuit board. One of the embodiments is a hand-held unit with the control element being a joystick, auxiliary triggers being mounted on opposite sides of the hand held unit for establishing selective contact in an auxiliary circuit segment. The auxiliary triggers may be employed for example as a firing control. The other embodiment is a foot-operated control unit including a platform adapted to support the weight of an operator and includes an override switch responsive to the weight of the operator on the platform.

24 Claims, 13 Drawing Figures

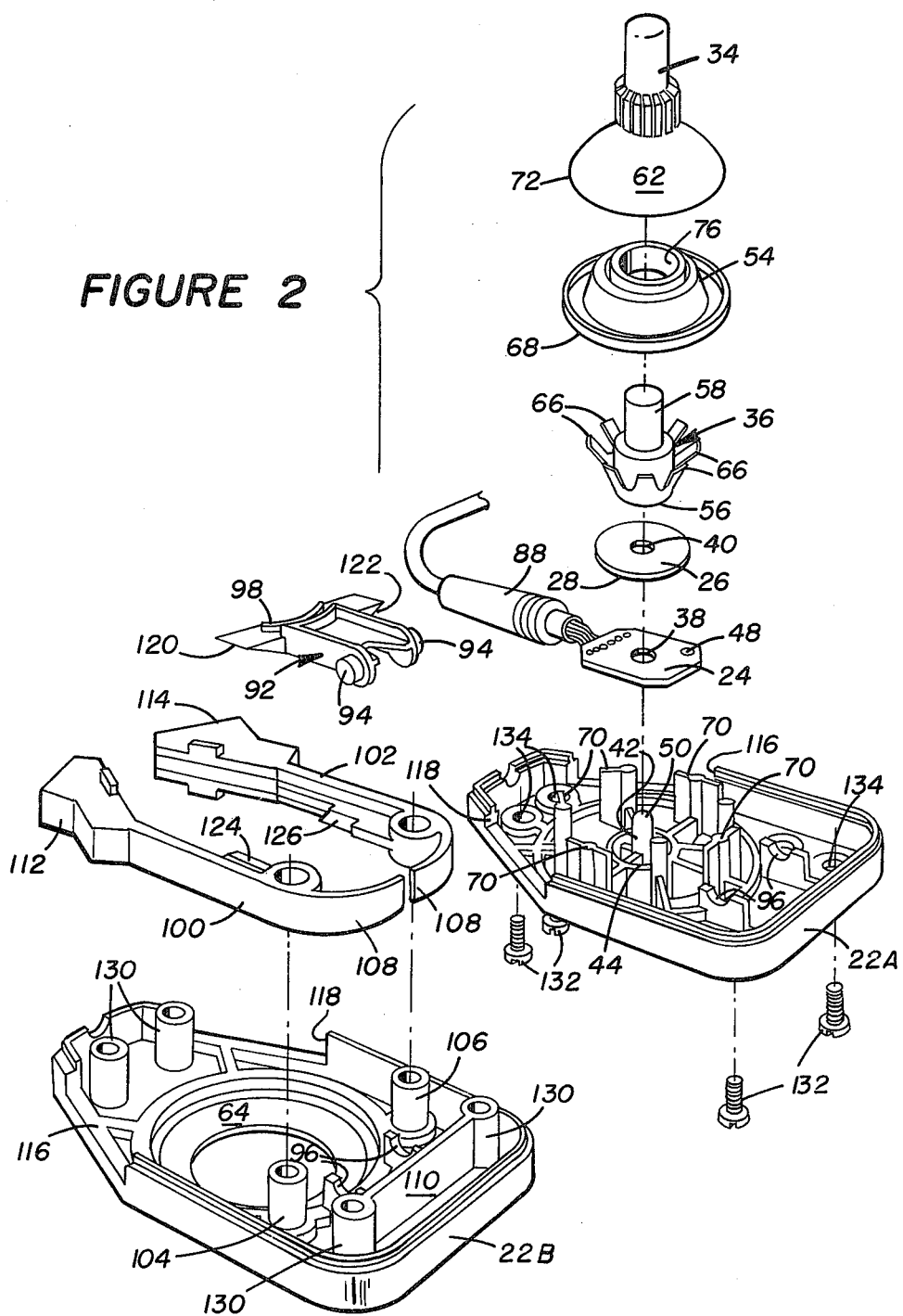

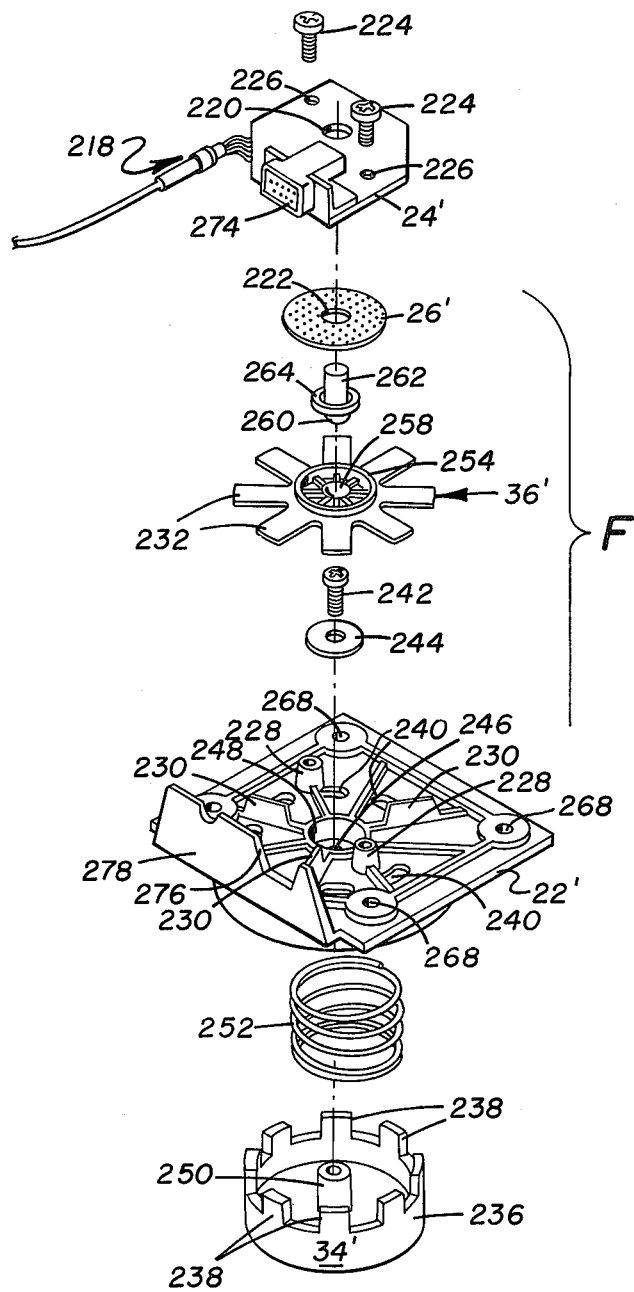

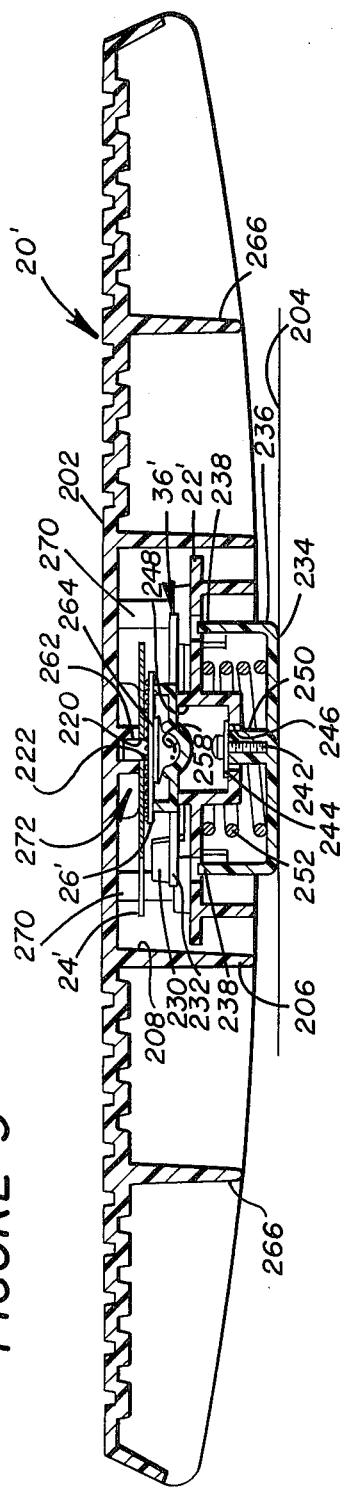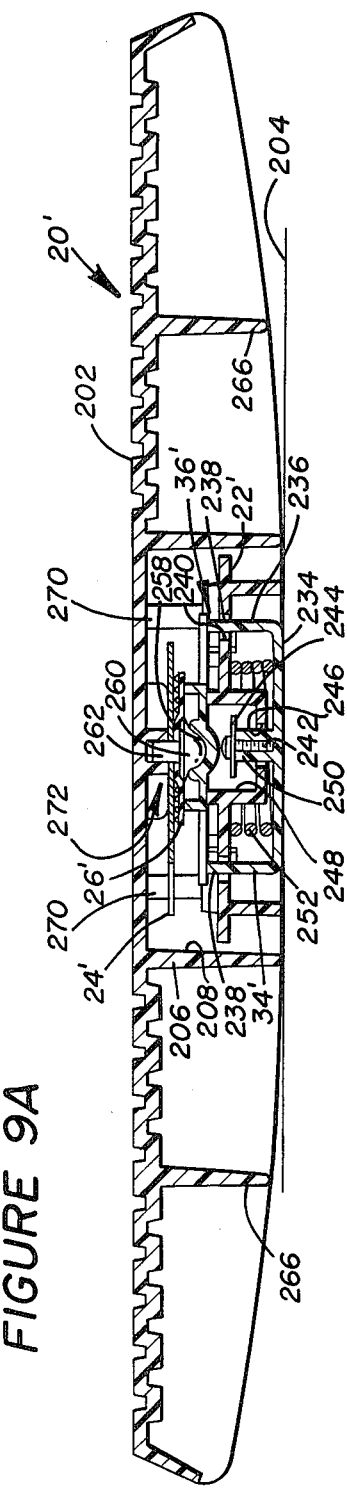

CONTROL UNIT FOR VIDEO GAMES AND THE LIKE

BACKGROUND OF THE INVENTION

The present invention relates to a control unit for video games and the like and more particularly to such a control unit for providing an output signal in response to multi-directional movement of a control element in the unit.

Control units for electronic or video games are well known in the prior art for establishing an output signal indicating the multi-directional movement of a control element in the unit. Typically, the multi-directional control element is a joystick which may be moved along x-y paths to control movement of a figure on the video screen. Such control units are also commonly adapted to provide a signal corresponding to 45° movement of the joystick for achieving movement of the figures on the screen at similar 45° angles.

In a typical prior control unit, a deformable member normally prevents contact with one of a combination of switches, a control element then being movable against the deformable member in order to make contact with one or more of the switches in the manner generally referred to above.

In other conventional control units, actuating force from the control element is applied through a flexible bubble located above the switch means. The switch means is of course most commonly formed as an array of circuit segments on a printed circuit board.

In any event, substantial forces can be applied to the control element or joystick by an operator playing the video game. The control unit must designed to withstand such substantial forces. At the same time, it is also desirable to facilitate assembly of the control unit in order to minimize cost and also to assure registry between the various operating components in order to assure proper operation of the control unit.

Accordingly, there has been found to remain a need for a reliable and compact control unit for video games and the like.

SUMMARY OF THE INVENTION

It is therefore an object of the invention to provide a multi-directional control unit for video games and the like, the control unit being generally compact and simple to assemble while being reliable over its operating life.

More particularly, it is an object of the invention to provide a multi-directional control unit comprising a base structure, a circuit board mounted upon the base structure and having directional circuit segments arranged on its surface, a resilient conductive pad being arranged adjacent the circuit segments on the board and having a conductive surface generally coextensive with and normally maintained in spaced apart relation from the circuit segments, a control element capable of multi-directional movement relative to the base structure and a directional actuator associated with the control element, the directional actuator responding to movement of the control element for urging a portion of the conductive pad into electrical contact with a selected circuit segment on the board.

The use of a resilient conductive pad of the type referred to above has been found to provide numerous advantages within such control units both in facilitating assembly of the control unit and in assuring reliability over its operating life.

It is a further object of the invention to provide a multi-directional control unit further comprising limiting means associated with the base structure and control element for limiting relative movement therebetween in order to minimize transfer of excessive forces to the conductive pad. In such an arrangement, with the conductive pad and circuit board being supported by the base structure, the control unit may be designed to permit transfer of a generally optimum amount of pressure to establish electrical contact in the circuit segments. Preferably, the circuit board and resilient pad are located upon the base structure for example by pin means in order to assure their proper interaction with each other and with the other operating portions of the control unit.

It is another object of the invention to provide such a control unit wherein the directional actuator is formed with flange means for engaging the resilient pad and a plurality of resilient fingers generally opposite the flanges for assuring proper transfer of forces from the control element to establish contact in selected circuit segments on the board.

It is yet another object of the invention to provide a control unit including an auxiliary or firing circuit operable by trigger elements arranged in opposed relation upon the control unit. Preferably, the auxiliary circuit includes a circuit segment on the same board as the directional circuit segments with an auxiliary actuator responsive to either or both of the triggers for actuating the auxiliary circuit. As will be apparent from the following description, the auxiliary or firing assembly of the present control unit may be used with or without other features of the invention as summarized above.

It is a further object of the invention to provide such a control unit adapted for use on a surface such as a floor or the like, the control unit including platform means for supporting an operator's weight and permitting the operator to shift his weight upon the platform in order to produce a corresponding output signal. Preferably, the foot-operated control unit may include may of the features as set forth above for the invention. However, it is particularly contemplated that the foot-operated control unit include an override switch assembly responsive to the operator's weight on the platform.

Additional objects and advantages of the invention are set forth in the following description having reference to the accompanying drawings.

BRIEF DESCRIPTION OF THE DRAWINGS

FIG. 2 is an exploded assembly view better illustrating the internal components of the hand-held embodiment of FIG. 1.

FIG. 8 is an exploded assembly view better illustrating internal components of the embodiment of FIG. 7.

FIG. 9 is a view taken along section line 9—9 of the foot-operated control unit of FIG. 7.

FIG. 9A is a view similar to FIG. 9 but with the components of the control unit illustrated in relative position with the weight of an operator or player being supported on the unit.

DESCRIPTION OF THE PREFERRED EMBODIMENTS

Figure 3:
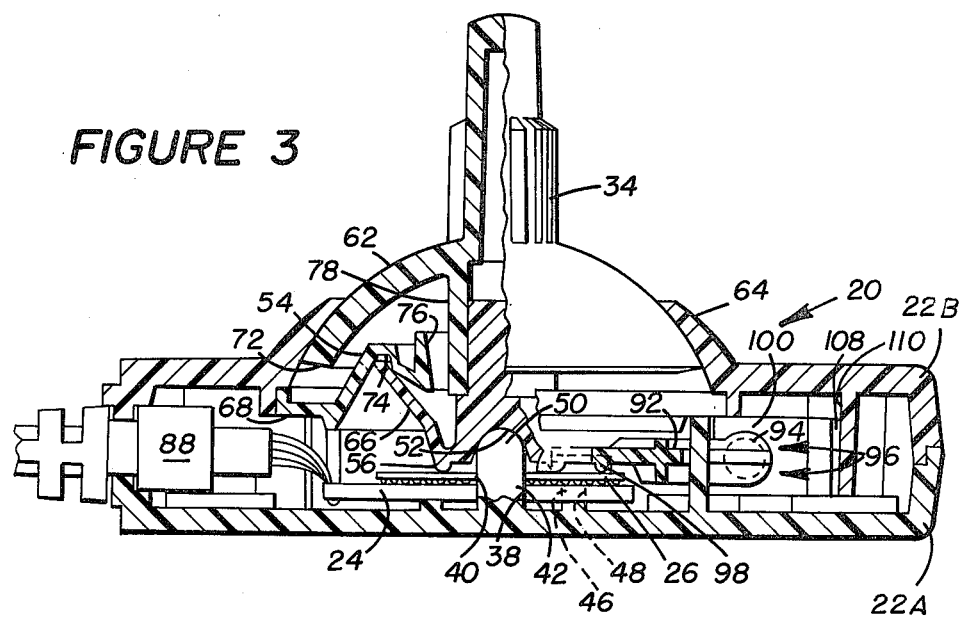
FIG. 3 is a view taken along section line 3—3 of FIG. 1.

Referring to the drawings, the two embodiments illustrated respectively in FIGS. 1-6 and 7-12 include a number of common features which are summarized immediately below with particular reference to the embodiment of FIGS. 1-6. The inclusion of those common features in the embodiment of FIGS. 7-12 will be apparent from the following detailed description of that embodiment.

Figure 1:
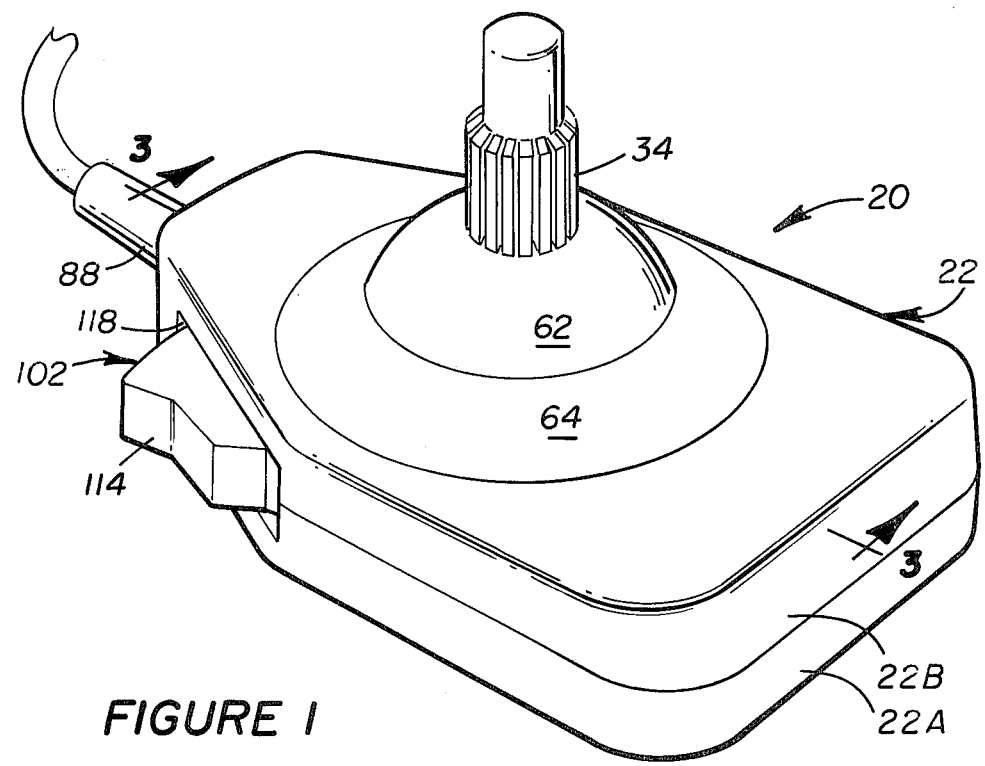
FIG. 1 is an isometric view of a hand-held embodiment of the control unit of the present invention.

Referring now particularly to FIGS. 1-3, a hand-held control unit is generally indicated at 20. A two-part housing 22 provides a base structure for internal components as will be described in greater detail below. In particular with the embodiment of FIGS. 1-3, a lower housing member 22A preferably provides the base structure or support for the internal components while an upper housing member 22B meets with the lower member 22A to capture or enclose the internal components in a manner described in greater detail below.

Figure 4:
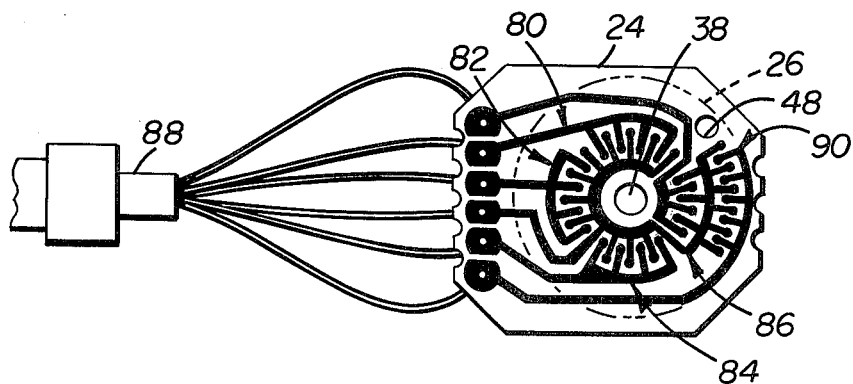
FIG. 4 is a fragmentary view of a printed circuit assembly on a circuit board in the control unit of FIG. 1.
Figure 6:
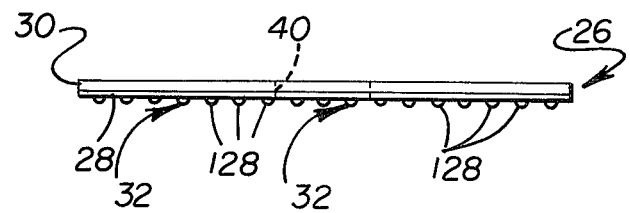
FIG. 6 is a side view in elevation of the resilient conductive pad of FIG. 5.
Figure 5:
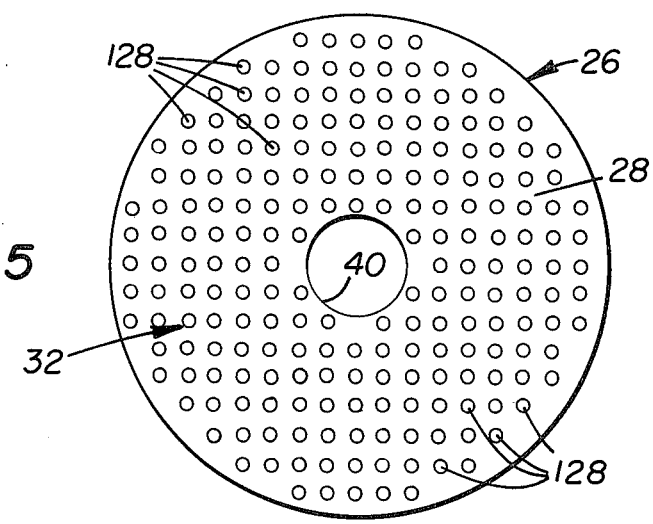
FIG. 5 is a fragmentary plan view of a resilient conductive pad contemplated by the invention for cooperation with the printed circuitry on the board of FIG. 4.

The major internal components of the control unit 20 include a circuit board 24 upon which various circuit segments are formed as is better illustrated in FIG. 4 and as is described in greater detail below. A resilient pad 26 is arranged adjacent the circuit board 24 in register with the various circuit segments as also illustrated in FIG. 4. The pad 26 is preferably formed with a conductive surface 28 mounted on a resilient backing 30. The conductive surface 28 faces the circuit board 24 and includes a raised non-conductive maxtrix 32 (also see FIGS. 5 and 6) to normally maintain the conductive surface 28 in spaced-apart relation from the circuit segments on the circuit board 28.

Other major internal components of the control unit 20 include a control element 34 generally in the form of a joystick which is movably mounted on the control unit and captured by the upper housing member 22B. A directional actuator 36 is arranged between the control element 34 and the conductive pad 26 for transferring actuating forces from the control element to the pad in a manner described in greater detail below.

The components of the control unit 20 as summarized above are also indicated in the embodiment of FIGS. 7-12 by means of similar primed numerals except for the housing members 22A and 22B. These common features are described in greater detail below in connection with each of the two embodiments and it will be apparent that the combination facilitates assembly of the control unit while assuring proper register of the parts and reliable operation over an extended life of the control unit.

Referring again particularly to FIGS. 1-3, the circuit board 24 and the conductive pad 26 (also see FIGS. 5 and 6) are formed with central openings 38 and 40 respectively. The circuit board 24 and conductive pad 26 are axially located upon the lower housing member 22A by means of a pin 42 extending upwardly through the central openings. Support webbing 44 surrounding the pin 42 provides a base for supporting the circuit board 24 as may be best seen in FIG. 3. An additional offset pin 46 on the lower housing member 22A also passes though a similarly offset opening 48 in the circuit board to prevent undesireable rotation of the circuit board. The circuit segments formed thereon thus remain in proper register with other components of the control unit as discussed below.

The upper end 50 of the pin 42 is rounded and mates with a similarly rounded socket 52 in the actuator 36 so that the adaptor is supported on the pin while being free for multi-directional movement with the control element 34.

The control unit 20 includes an additional component in the form of an adaptor plate 54 which is arranged between the control element 34 and the directional actuator 36. The adaptor plate 54 serves to locate and limit rotational movement of the control element while also permitting the control element to be rotated without transferring torque forces through the actuator to the conductive pad 26. The manner in which the adaptor plate 54 accomplishes these objectives will be apparent from the following description.

The directional actuator 36 includes a cylindrical boss or flange 56 extending downwardly toward the conductive pad 26. A shaft 58 is formed on the opposite end of the directional actuator for register with a cylindrical bore 60 in the control element 34 to assure that angularly inclined movement of the control element 34 is transferred to the adaptor plate 54.

A dome-shaped plate 62 is secured to the control element 34 and mates with a similar dome-shaped flange 64 on the upper housing member 22B. The flange 64 permits inclined movement of the control element 34 in any radial direction while capturing the control element and retaining it in place within the control unit.

Before describing details of the adaptor plate 54, it is noted that the directional actuator 36 also includes a plurality of resilient fingers 66 arranged in opposition to the cylindrical flange 56 and extending radially outwardly and upwardly toward the control element and the adaptor plate 54. The purpose of these fingers is described below following the description of the adaptor plate 54.

The adaptor plate 54 includes a flat annular shoulder 68 about its circumference which rests upon suport webs 70 on the lower housing member (see FIG. 2). The annular shoulder 68 on the adaptor plate is also arranged for engagement with the peripheral edge 72 of the dome-shaped plate 62 in order to limit inclined movement of the control element in any direction. Thus, substantial forces which may be applied to the control element or joystick are resisted by the adaptor plate and the structural support web 70 on the housing rather than being transferred to the conductive pad 26 or the circuit board 24.

In addition, the adaptor plate 54 forms an intermediate cylindrical recess 74 which extends downwardly for engagement with the resilient fingers 66 on the directional actuator. The opposed relation of the fingers 66 with the cylindrical flange 56 thus assures that movement of the control element properly develops compressive force applied to a selected portion of the condutive pad as will be described below relative to the circuit segments on the board 24 and tends to return the control element 34 to a neutral position. However, it may be seen that the configuration of the control element 34, the adaptor plate 54 and the directional actuator 36 assures that inclined movement of the control element in any angular direction is transferred through corresponding finger 66 on the directional actuator so that an appropriate portion of the cylindrical flange 56 engages the conductive pad.

An inner bore 76 on the adapter plate 54 tapers upwardly and outwardly in a cone-shaped configuration about a cylindrical surface 78 of the control element. The spacing between the tapered bore 76 and cylindrical surface 78 is selected relative to spacing between the peripheral edge 72 and the annular shoulder 68 to provide additional limits for inclined movement in any angular direction of the control element 34. In particular, the spacing and configuration for these components is selected so that as the control element is inclined approximately 8° in any angular direction, the peripheral edge 72 on the control element engages the shoulder 68 on the adapter plate at generally the same time that the cylindrical surface 78 of the control element contacts the tapered bore 76 on the adapter plate. These features thus tend to insure proper transfer of forces through the directional actuator 36 to the conductive pad while limiting movement of the control element by interaction with structural components of housing in order to prevent damage to the conductive pad and circuit board.

Referring now particularly to FIG. 4, the circuit board 24 includes an array of four directional circuit segments 80, 82, 84 and 86 formed as quadrants about the central opening 38. A coupler 88 of generally conventional construction is illustrated in FIG. 4 and also in FIGS. 1-3. The coupler 88 is connected to the directional circuit segments 80-86 as well as to an auxiliary circuit segment 90 which is formed on a radially outer portion of the circuit board.

The circuit segments 80-86 and 90 are formed as conventional printed circuits on the board 24. It may also be seen from FIG. 4 that the conductive pad 26 (illustrated in phantom) is generally coextensive with all of the circuit segments. The circuit segments 80-86 and 90 are also of a conventional type wherein electrical contact with a suitable conductive surface provides a closed circuit in any of the segments. Furthermore, the four directional circuit segments 80-86 are adapted to respond separately to movement of the control element 34 in perpendicular X-Y directions. However, for use with many conventional video or electronic games, it is also necessary to provide for actuation in eight directions including 45° movement of the contol element between any two of the adjacent circuit segments 80-86. Accordingly, electrical contact may be established with any two adjacent circuit segments for achieving this purpose. In addition, it will be apparent that the circuit board, conductive pad 26 and directional actuator 36 are designed to prevent accidental electrical contact simultaneously with more than two circuit segments.

An auxiliary actuator 92 includes shafts 94 secured in place by spaced apart journals 96 formed on both housing member 22A and 22B. A flange 98 is formed on an end of the auxiliary actuator 92 opposite the shafts 94 and overlaps the conductive pad 26 above the auxiliary circuit segment 90.

Trigger elements 100 and 102 for operating the auxiliary actuator 92 are pivotably mounted on posts 104 and 106 formed on the upper housing member 22B. Leaf springs 108 are formed on the ends of the trigger elements 100 and 102 adjacent the posts 104 and 106 for resilient engagement with a wall 110 also formed on the lower housing member 22A. The outer ends 112 and 114 extend through openings 116 and 118 formed by the two-part housing 22 so that the trigger elements are accessible on opposed sides of the housing. As will be described immediately below, the trigger elements 100 and 102 may operate the auxiliary actuator 92 independently or in unison to facilitate either right-handed or left-handed operation of the control unit. It is further noted at this point that the configuration of the housing is designed to facilitate holding of the housing in one hand while operating the directional control element 34 with the other hand.

Returning to the auxiliary actuator 92, it has opposed ramps 120 and 122 both opposite the flange 98 for register with similarly inclined ramp surfaces 124 and 126 on the trigger elements 100 and 102. Either or both of the trigger elements may be rotated about the posts 104 and 106 for engaging either or both of their ramp surfaces 124 and 126 with the ramps 120 and 122 for operating the auxiliary actuator 92.

The auxiliary switch arrangement may of course be used with or without the directional switching assembly of the control unit 20 as described above.

The upper housing member 22B includes threaded bosses 130 with screws 132 passing through mating openings 134 in the lower housing member 22A in order to secure the housing members 22A and 22B together in order to complete the control unit 20.

Construction of the conductive pad 26 was described above. However, it is again noted that the pad preferably includes a thin conductive layer 28 mounted on a backing 30 formed from suitable resilient material with the conductive surface 28 being arranged in the control unit 20 in facing relation with the circuit segments on the circuit board 24 (see FIGS. 5 and 6). The nonconductive matrix 32 is formed by a plurality of small nonconductive spheres or bubbles 128 which are preferably compressible and have an uncompressed dimension of approximately 5 mils for example. Such a resilient conductive pad is commercially availabe for example from Sunarrow Koeki Co., Ltd. In any event, the matrix of bubbles 128 tends to be compressed as the pad 26 is urged toward the circuit board in order to establish electrical contact with one or more of the circuit segments by means of the conductive surface 28.

It is believed that operation of the hand-held control unit 20 will be obvious from the preceding description. However, the mode of operation is described briefly below in order to assure a complete understanding of the invention. With the components of the control unit 20 being assembled in the manner illustrated for example in FIG. 3, the control element or joystick 34 is inclined in any angular direction. This motion is transferred through the adapter plate 54 to the directional actuator 36 so that a corresponding portion of the flange 56 compresses an adjacent portion of the conductive pad 26 to establish contact with an underlying one of the circuit segments 80-86. As noted above, electrical contact may be made with one of the directional circuit segments or with two adjacent directional circuit segments as necessary for operation of many electronic or video games. At the same time, either or both of the trigger elements 100 and 102 may be depressed in order to rotate the auxiliary actuator 92 and cause its flange 98 to compress the conductive pad 26 above the auxiliary circuit segment 90. Electrical signals corresponding to these movements of the control element 34 or trigger elements 100 and 102 are communicated to a suitable electronic game unit (not shown) by means of the coupler 88.

Turning now to FIGS. 7–12, another embodiment 20' of the control unit is illustrated. The control unit 20' is adapted to support the weight of a player or operator so that the operator, by shifting his weight in any direction, may produce relative movement between the control unit 34' and base structure 36' in the same manner as described for the control unit 20 of FIGS. 1–6 to produce corresponding electrical signals for transmission to an electronic or video game.

Figure 7:
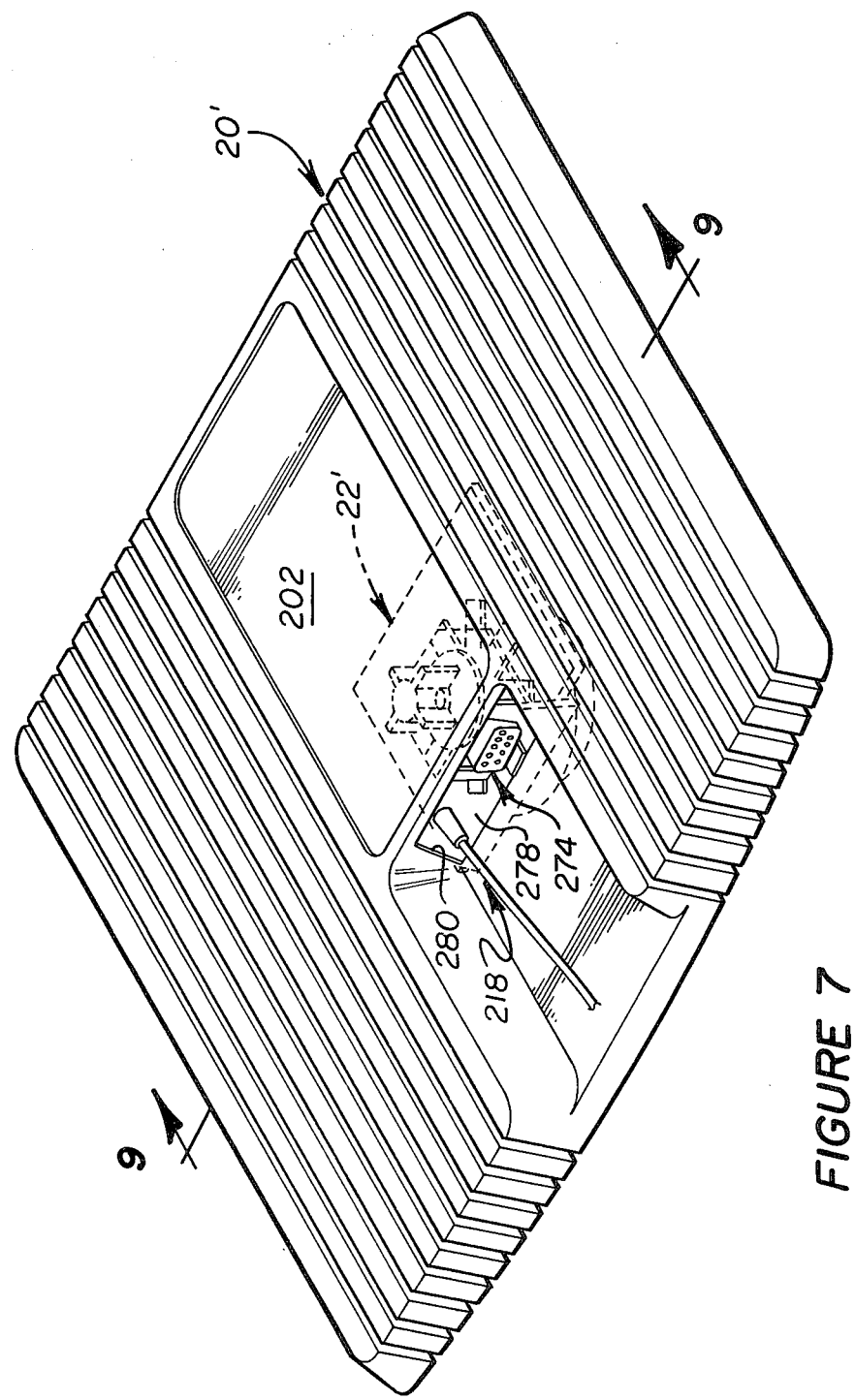
FIG. 7 is an isometric view of foot-operated embodiment of the control unit of the invention.

As may be best seen in FIG. 7 and FIGS. 9 and 9A, the foot-operated control unit 20' is provided with a platform 202 which is secured to the base 22' in a manner described below. With the control unit 20' being supported by a floor or other surface 204, the control element 34' remains engaged with the floor because of the operator's weight while the platform 202 inclines angularly to produce the same relative motion as in the control unit 20 of FIGS. 1–6. The manner in which this is accomplished as well as the other components of the control unit 20' are described and discussed below.

Referring to FIGS. 8 and 9, the platform 202 includes an inner web structure 206 which is preferably of rectangular configuration and serves two functions. Initially, the inner web 206 enters into engagement with the floor 204 as illustrated in FIG. 9A when an operator's weight is supported upon the platform 202. The rectangular configuration of the inner web 206 tends to bias the platform for movement only along x-y directions. However, movement in additional angular directions is also possible as will be described below. The inner web 206 also forms a rectangular cavity 208 for receiving most of the internal components of the foot operated control unit 20'. Those components are described immediately below.

Figure 10:
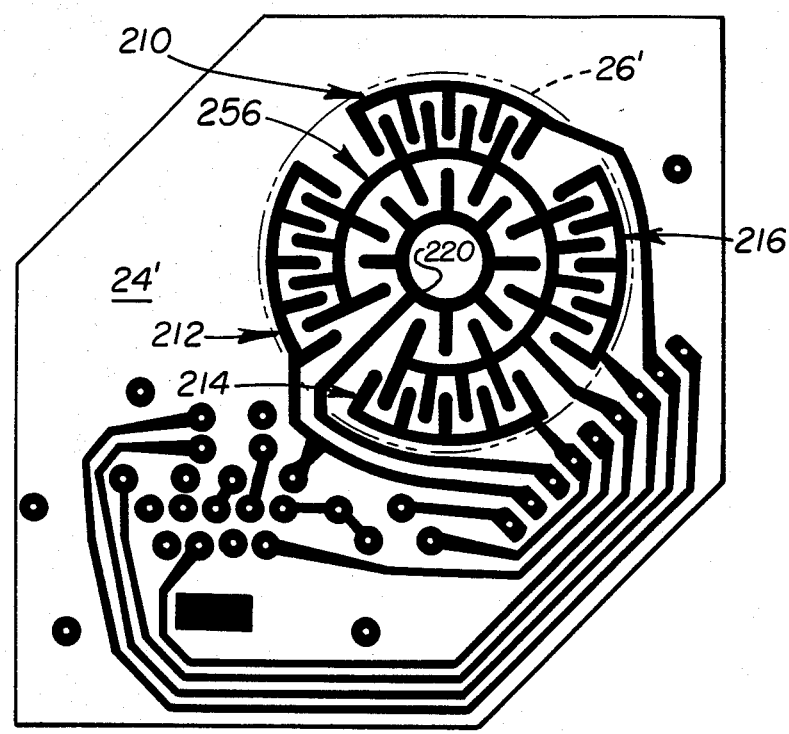
FIG. 10 is a view of printed circuitry on a circuit board for the control unit of FIG. 7.
Figure 11:
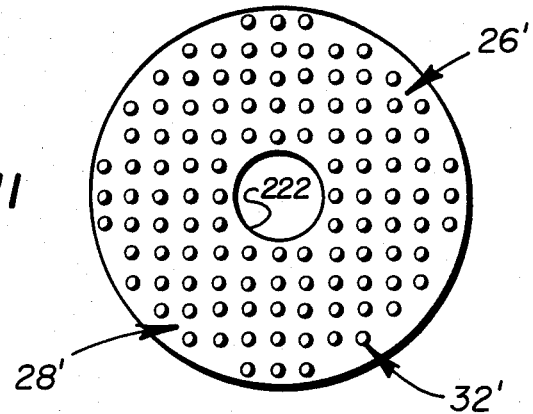
FIGS. 11 and 12 illustrate a resilient conductive pad similar to that of FIGS. 5 and 6 but adapted for use with the control unit of FIGS. 7-10.
Figure 12:
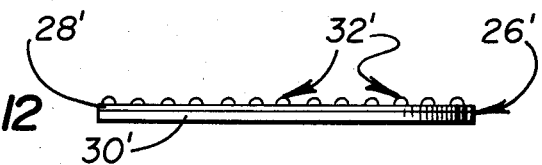

Referring momentarily to FIG. 10, the circuit board 24' includes four directional circuit segments 210, 212, 214 and 216 which are interconnected with coupler means 218 similar to the coupler 88 of the control unit 20. The circuit plate 24' and conductive pad 26' also include central opening 220 and 222 to facilitate their location relative to the directional actuator 36' in the same manner described above for the embodiment 20 of FIGS. 1–6. As may be best seen in FIG. 8, the circuit board 24' is arrange with its circuits segments facing downwardly toward the base 22', the circuit board 24' being secured to the base 2' by means of screws 224 passing through openings 226 in the circuit board 24' for engagement with threaded bosses 228 formed on the base 22'. The bosses 228 also serve to establish spacing between the base 22' and the circuit board 24' as well as resisting rotational movement of the circuit board 34', thus replacing the function of the offset pin 46 in the control unit 20 of FIGS. 1–6.

As with the embodiment of FIGS. 1–6, the conductive pad 26' is arranged with its conductive surface 28' adjacent the circuit segments on the printed circuit board 24'. The directional actuator 36' is then arranged between the conductive pad 26' and the base 22'.

Radially extending webs 230 are also formed on the base 22' to provide support for the printed circuit board 24'. At the same time, the radially extending webs 230 extend between radially extending flexible fingers 232 on the directional actuator 36' in order to maintain the directional actuator 36' in angular alignment with the base 22' and the circuit board 24'.

The control element 34' is formed as a piston and includes a surface 234 for engagement with the floor 204. The cylindrical wall 236 terminates at its upper end in circumferentially spaced apart wall portions 238 which extend through similar circumferentially spaced apart slots 240 in the base 22'. The fingers 232 on the directional actuator 36' are also of similar circumferential spacing so that they are maintained in respective engagement with the wall portions 238 of the control element by tne radially extending webs 230 on the base 22'.

A screw 242 passes through a washer 244 and an opening 246 in a counterbore 248 of the base 22' for engagement with a threaded boss 250 on the control element 34'. A coil spring 252 is captured between the control element 34' and the base 22'.

The directional actuator 36' also includes a cylindrical flange 254 extending upwardly for engagement with the conductive pad 26' in register with the directional circuit segments 210–216 on the circuit board 24'. Referring monentarily to FIG. 10, it may be seen that the directional circuit segments 210–216 are generally adjacent the outer perimeter of the conductive pad 26' with an additional circuit segment 256 being formed adjacent the opening 220. The additional circuit segment 256 is preferably contemplated as an override circuit responsive to the weight of an operator on the platform 202 and its operation is described immediately below. As may be seen in both FIGS. 8 and 9, a spherical socket 258 is formed centrally on the directional actuator 36' to mate with a spherical head 260 on an upwardly extending pin 262. The pin 262 accomplishes two purposes. Initially, it passes through the openings 222 and 220 in the conductive pad 26' and circuit board 24' in order to maintain then in axial location relative to the directional actuator 36'. In addition, an annular flange 264 is formed on the pin for engagement with the conductive pad 26', the flange 264 being in register with the override circuit segment 256 on the circuit board 24'.

With the circuit board 24', the conductive pad 26', the pin 262 and directional actuator 36' being arranged above the base structure 22', the base structure is then secured to the platform by means of screws (not shown) passing through openings 268 for engagement with threaded bosses 270 formed on the platform (see FIGS. 9 and 9A). Support webbing 272 is also centrally arranged upon the platform 202 between the threaded bosses 270 for positioning the circuit board 24'.

Spacing between the various components of the control unit 20' is selected so that upon initial assembly, both the flange 264 on the pin 262 and the flange 254 on the directional actuator 36' are adjacent the conductive pad 26' but without exerting compression force against the pad. Thus, the conductive surface 28' on the pad remains in spaced apart relation from all of the circuit segments on the board 24' because of the nonconductive matrix 32' (see FIGS. 11 and 12).

However, when an operator's weight is supported upon the platform 202, the control unit 20' asssumes a condition as illustrated in FIG. 9A. The operator's weight on the platform causes the platform and the base 22' to move downwardly against the spring 252 until the inner web 206 engages the floor 204. At that time, the position of the pin 262 causes its cylindrical flange 264 to compress a radially central portion of the pad 26' and close the override circuit segment 256.

As the operator's weight is then shifted upon the platform, the spherical head 260 on the pin 262 permits the directional actuator 36' to move relative to the base 22' and platform 202 along with the control element 34'. As with the control unit 20 of FIGS. 1-6, this movement of the directional actuator 36' causes its flange 254 to close one or more of the directional circuit segments 210-216 also in the same manner described above for the control unit 20 of FIGS. 1-6.

The control unit 20' is similar to the control unit 20 of FIGS. 1-6 in that structural means are provided for limiting relative movement between the combined platform and base 22' relative to the control element 34'. This structural feature comprises an outer web 266 formed on the platform 202. However, the outer web 266 does not extend downwardly as far as the inner web 208. Rather, the outer web and inner web are of different lengths so that as the platform is tilted in any direction about a fulcrum point established by a portion of the web 208, its travel is limited by engagement of a corresponding portion of the outer web 266 with the floor 204. Thus, there is structural cooperation between the control element 34' and base structure 22' in a similar manner as that described for the control unit 20 of FIGS. 1-6. However, as described immediately above, the structural limits in the foot operated control unit 20' involve cooperation of the floor surface 204.

It is believed that operation of the control unit 20' will be apparent from the preceding description. However, its operation is described briefly below in order to assure a complete understanding of the invention. Upon assembly, the control unit 20' tends to assume the position illustrated in FIG. 9. As a player or operator places his weight upon the platform 204, his weight is transfered from the platform through the base structure 22' and tends to compress the spring 252 until the inner webbing 208 of the platform engages the floor. At that time, the cylindrical flange 264 on the pin 262 urges a radially inner portion of the conductive pad 26 into electrical contact with the override circuit segment 256 on the circuit board. That circuit or switch may thus be used either for controlling the game unit or for example as a reset means.

The operator may then shift his weight upon the platform to tilt the platform and produce inclined movement between the base structure 22' and the control element 34'. As noted above, the rectangular configuration of the inner web 208 tends to limit this relative movement in x-y directions. However, the effect of the rectangular inner web can be overcome in order to achieve actuation of two adjacent directional circuit segments in the same manner described for the control unit 20.

During this relative movement between the control unit 34' and base structure 22', the flange 264 tends to remain in engagement with the override circuit segment because of the pivotal movement permitted by its spherical head 260 in the socket 258. At the same time, the cylindrical flange 254 on the directional actuator 36' similarly tends to compress respective portions of the conductive pad 26' in order to close contact in one or an adjacent pair of the directional circuit segments 210-216.

An additional operating feature of the control unit 20' is also possible in that a separate hand-held control unit such as that indicated at 20 in FIGS. 1-6 may be combined with the foot operated control unit 20' to permit additional control in the related video or electronic game. For this purpose, a receptacle 274 is mounted on the circuit board 24' for permitting engagement with the hand-held control unit. Referring also to FIG. 7, the receptacle 274 extends through an opening 276 in a vertical wall 278 formed on the base structure 22'. With the wall 278 being in register with an exposed opening 280 in the platform, a hand-held unit such as that indicated at 20 may be plugged into the receptacle 274 and controlled by the operator standing on the foot operated control unit 20'.

Various modifications and additions will be apparent for the present invention from the preceding description of the preferred embodiments 20 and 20'. Accordingly, the scope of the present invention is defined only by the following appended claims.

What is claimed is:

1. A multi-directional control unit for video games and the like, comprising
   a base structure,
   a circuit board mounted relative to said base structure, directional circuit segments being arranged on a surface of said circuit board,
   resilient conductive pad means arranged adjacent said surface of said circuit board, said resilient conductive pad means comprising a conductive surface generally coextensive with said circuit segments and means for normally maintaining said conductive surface in spaced apart relation from said circuit board surface,
   said circuit board and resilient pad means being formed with central openings and further comprising pin means for locating said circuit board and pad means relative to said base structure,
   a control element capable of multi-directional movement relative to said base structure,
   directional actuator means associated with said control element adjacent said conductive pad means, said directional actuator means being responsive to movement of said control element for urging a portion of said conductive pad means into electrical contact with a circuit segment on said circuit board, said directional actuator means having a cylindrical flange for engaging said pad means having a circumferential arrangement of resilient fingers opposite said flange for effective engagement with said control element in order to transfer forces from said control element through said cylindrical flange to said conductive pad means, and
   coupler means connected with said circuit segments on said circuit board.

2. A multi-directional control unit for video games and the like, comprising
   a base structure,
   a circuit board mounted relative to said base structure, directional circuit segments being arranged on a surface of said circuit board,
   resilient conductive pad means arranged adjacent said surface of said circuit board, said resilient conductive pad means comprising a conductive surface generally coextensive with said circuit segments and means for normally maintaining said conductive surface in spaced apart relation from said circuit board surface,
   a control element capable of multi-directional movement relative to said base structure, directional actuator means associated with said control element adjacent said conductive pad means, said directional actuator means being responsive to movement of said control element for urging a portion of said conductive pad means into electrical contact with a circuit segment on said circuit board, coupler means connected with said circuit segments on said circuit board, and an adaptor element arranged for interaction between said control element and said directional actuator means, said adaptor element comprising means for permitting relative rotation of said control element in order to prevent torque forces from being applied to said pad means.

3. A multi-directional control unit for video games and the like, comprising a base structure a circuit board mounted relative to said base structure, directional circuit segments being arranged on a surface of said circuit board, resilient conductive pad means arranged adjacent said surface of said circuit board, said resilient conductive pad means comprising a conductive surface generally coextensive with said circuit segments and means for normally maintaining said conductive surface in spaced apart relation from said circuit board surface, a control element capable of multi-directional movement relative to said base structure, directional actuator means associated with said control element adjacent said conductive pad means, said directional actuator means being responsive to movement of said control element for urging a portion of said conductive pad means into electrical contact with a circuit segment on said circuit board, coupler means connected with said circuit segments on said circuit board, and an adaptor element arranged for interaction with said directional actuator means to permit relative rotation of said control element in order to prevent torque forces from being applied to said pad means, said adaptor element including cylindrical means for limiting multi-directional movement of said control element, said base structure including means for supporting said adaptor element to limit application of force from said control element to said conductive pad means.

4. The control unit of claim 3 wherein said directional actuator means has a cylindrical flange for engaging said pad and a circumferential arrangement of resilient fingers opposite said flange for engagement with said control element by means of said adaptor element in order to transfer forces from said control element to said conductive pad means.

5. The control unit of claim 4 wherein said circumferentially arranged resilient fingers extend radially outwardly and axially toward said adaptor element.

6. A multi-directional control unit for video games and the like, comprising a base structure, a circuit board mounted relative to said base structure, directional circuit segments being arranged on a surface of said circuit board, resilient conductive pad means arranged adjacent said surface of said circuit board, said resilient conductive pad means comprising a conductive surface generally coextensive with said circuit segments and means for normally maintaining said conductive surface in spaced apart relation from said circuit board surface, a control element capable of multi-directional movement relative to said base structure, directional actuator means associated with said control element adjacent said conductive pad means, said directional actuator means being responsive to movement of said control element for urging a portion of said conductive pad means into electrical contact with a circuit segment on said circuit board, said directional actuator means having a circumferential arrangement of resilient fingers for effective engagement with said control element in order to transfer forces from said control element to said pad means, and coupler means connected with said circuit segments on said circuit board.

7. The control unit of claim 6 wherein said circumferentially arranged resilient fingers extend radially outwardly and axially toward said control element.

8. A multi-directional control unit for video games and the like, comprising a base structure, a circuit board mounted relative to said base structure, directional circuit segments being arranged on a surface of said circuit board, resilient conductive pad means arranged adjacent said surface of said circuit board, said resilient conductive pad means comprising a conductive surface generally coextensive with said circuit segments and means for normally maintaining said conductive surface in spaced apart relation from said circuit board surface, a control element capable of multi-directional movement relative to said base structure, directional actuator means associated with said control element adjacent said conductive pad means, said directional actuator means being responsive to movement of said control element for urging a portion of said conductive pad means into electrical contact with a circuit segment on said circuit board, and coupler means connected with said circuit segments on said circuit board, said circuit board comprising an auxiliary circuit segment on its surface, and further comprising an auxiliary actuator and respectively opposed trigger elements for moving said auxiliary actuator toward said pad means in order to urge a portion of said pad means into electrical contact with said auxiliary circuit segment.

9. The control unit of claim 8 wherein said opposed trigger elements are operable separately and in combination for moving said auxiliary actuator toward said pad means.

10. The control unit of claim 9 wherein said auxiliary actuator includes opposed ramps and said opposed trigger elements each include a ramp means for respective engagement with one of said opposed ramps.

11. The control unit of claim 10 wherein said base structure is a first housing member and further comprising a second housing member for engagement with said first housing member to capture said movable control element, said trigger elements extending through openings on opposite sides of said first and second housing members.

12. A multi-directional control unit for video games and the like adapted for use on a surface such as a floor or the like, comprising
  a base structure,
  a circuit board mounted relative to said base structure, directional circuit segments being arranged on a surface of said circuit board,
  resilient conductive pad means arranged adjacent said surface of said circuit board, said resilient conductive pad means comprising a conductive surface generally coextensive with said circuit segments and means for normally maintaining said conductive surface in spaced apart relation from said circuit board surface,
  a control element capable of multi-directional movement relative to said base structure,
  directional actuator means associated with said control element adjacent said conductive pad means, said directional actuator means being responsive to movement of said control element for urging a portion of said conductive pad means into electrical contact with a circuit segment on said circuit board, and
  coupler means connected with said circuit segments on said circuit board,
  said base structure including platform means for supporting an operator's weight, both said base structure and said control element being adapted for interaction with the floor surface so that shifting of the operator's weight upon said platform means causes multi-directional movement of said control element relative to said base structure, said platform means being secured to said base structure and including web means adapted for engagement with the floor surface, said control element extending downwardly from said base structure to remain in generally constant alignment with the floor surface whereby shifting of the operator's weight on said platform means tends to produce multi-directional movement of said control element relative to said base structure.

13. The control unit of claim 12 wherein said web means on said platform means includes an inner web adapted to surround said control element and engage the floor when the operator's weight is supported upon said platform means so that the operator's weight is substantially supported by the inner web.

14. The control unit of claim 13 wherein said web means also includes outer webbing arranged for engagement with the floor surface to limit pivitol movement of said platform means on said inner web and thereby limit multi-directional movement of said control element relative to said base structure.

15. The control unit of claim 14 wherein said inner web is of a rectangular configuration for biasing of movement between said control element and said base structure in X-Y directions.

16. The control unit of claim 13 wherein said inner web is of a rectangular configuration for biasing of movement between said control element and said base structure in X-Y directions.

17. The control unit of claim 12 further comprising override switch means responsive to the operator's weight on said platform means.

18. The control unit of claim 17 wherein said override switch means includes an override circuit segment on said circuit board and override actuator means responsive to the operator's weight on said platform means for urging a portion of said conductive pad means into electrical contact with said override circuit segment.

19. The control unit of claim 18 wherein said directional actuator means has a cylindrical flange for engaging said pad means to establish electrical contact with said directional circuit segments.

20. The control unit of claim 19 wherein said override actuator comprises pin means nested within said directional actuator means, said pin means having a flange adapted for engaging said conductive pad means when the operator's weight is supported upon said platform means and for remaining in engagement with said pad means during relative movement between said control element and base structure for operating said directional circuit segments.

21. The control unit of claim 20 wherein said control element includes a surface adapted to rest on the floor surface and cylindrically spaced apart wall portions registering with cylindrically spaced apart slots in said base structure, said directional actuator means including radially extending, flexible fingers for engagement with said respective wall portions.

22. The control unit of claim 21 further comprising spring means captured between said control element and said base structure for urging them apart.

23. The control unit of claim 12 wherein said control element includes a surface adapted to rest on the floor surface and cylindrically spaced apart wall portions registering with cylindrically spaced apart slots in said base structure, said directional actuator means including radially extending, flexible fingers for engagement with said respective wall portions.

24. The control unit of claim 23 further comprising spring means captured between said control element and said base structure for urging them apart.

* * * * *